United States Patent
Isaacson et al.

(10) Patent No.: US 12,539,924 B2
(45) Date of Patent: Feb. 3, 2026

(54) MODULAR TRAILER WALL SYSTEM

(71) Applicant: GS ENGINEERING, INC., Houghton, MI (US)

(72) Inventors: Kevin Isaacson, Atlantic Mine, MI (US); Robert Minger, Houghton, MI (US); Hunter Rautiola, Hancock, MI (US)

(73) Assignee: GS ENGINEERING, INC., Houghton, MI (US)

( * ) Notice: Subject to any disclaimer, the term of this patent is extended or adjusted under 35 U.S.C. 154(b) by 489 days.

(21) Appl. No.: 18/107,903

(22) Filed: Feb. 9, 2023

(65) Prior Publication Data

US 2024/0270328 A1    Aug. 15, 2024

(51) Int. Cl.
*B62D 33/04* (2006.01)
*B62D 33/033* (2006.01)

(52) U.S. Cl.
CPC ......... *B62D 33/046* (2013.01); *B62D 33/033* (2013.01)

(58) Field of Classification Search
CPC .... B62D 33/046; B62D 33/033; B62D 33/03; B62D 63/061
See application file for complete search history.

(56) References Cited

U.S. PATENT DOCUMENTS

| | | | |
|---|---|---|---|
| 5,480,180 A * | 1/1996 | Fuller | B62D 33/033 280/491.1 |
| 6,378,893 B1 * | 4/2002 | Jager | B62D 33/033 280/401 |
| 6,537,014 B1 * | 3/2003 | Ridgdill | B60P 3/06 296/182.1 |
| 6,834,882 B1 * | 12/2004 | Boyd | B60P 3/122 280/789 |
| 6,962,370 B2 | 11/2005 | Simpson | |
| 7,118,158 B2 | 10/2006 | Schlipp | |
| D561,648 S * | 2/2008 | Shelton | D12/101 |
| 7,475,901 B2 * | 1/2009 | Winter | B62D 63/061 280/638 |
| 7,543,842 B1 * | 6/2009 | Fiorini | B62B 3/025 280/43 |
| 7,708,299 B2 * | 5/2010 | Duval | B60P 1/435 280/789 |
| 8,448,978 B2 * | 5/2013 | Alvarino | B62D 63/067 280/638 |

(Continued)

FOREIGN PATENT DOCUMENTS

AU    2010347127    9/2011

*Primary Examiner* — Jason S Morrow
(74) *Attorney, Agent, or Firm* — Brooks Kushman P.C.

(57) ABSTRACT

A modular trailer wall system for containing loads. The trailer system is detachably attached to a deck of a utility trailer, the deck and wall system being adapted to be towed by a vehicle. The wall system has two side walls extending upwardly from the pair of lateral edges of the deck. A front wall extends upwardly from the leading edge of the deck. A removable, adjustably located partition extends upwardly from the deck. The removable partition is adapted to extend between the two side walls at a position that lies above or ahead of the trailing edge of the deck. Locking mechanisms detachably attach the removable partition in its upright position to one or more of the side walls. Attachment mechanisms detachably secure the wall system to the deck.

18 Claims, 16 Drawing Sheets

(56) References Cited

U.S. PATENT DOCUMENTS

| | | | | |
|---|---|---|---|---|
| 9,308,855 B1* | 4/2016 | Hancock | ............... | B60P 7/0807 |
| 9,932,078 B1* | 4/2018 | Nehring | ................. | B60P 1/003 |
| 9,937,962 B1* | 4/2018 | Tyler | ................... | B62D 27/065 |
| 10,106,207 B2* | 10/2018 | Fassezke | .............. | B62D 33/023 |
| 10,336,238 B2* | 7/2019 | Williams | .............. | B60P 7/0823 |
| 10,676,144 B2* | 6/2020 | Barnes | ................ | B62D 63/064 |
| 11,518,290 B2* | 12/2022 | May | ....................... | B60P 1/435 |
| 12,312,019 B2* | 5/2025 | Pard | ....................... | B60K 17/08 |
| 2003/0098590 A1* | 5/2003 | Chechuck | ................. | B60P 7/08 |
| | | | | 296/26.04 |
| 2003/0173758 A1* | 9/2003 | Badger | .................. | E04H 15/48 |
| | | | | 280/656 |
| 2007/0182150 A1* | 8/2007 | Simpson | ............. | B62D 63/061 |
| | | | | 280/789 |
| 2007/0262601 A1 | 11/2007 | Shoemaker | | |
| 2011/0260430 A1* | 10/2011 | Markovich | .......... | B62D 63/062 |
| | | | | 296/26.11 |
| 2019/0283656 A1* | 9/2019 | Visinski | .............. | B61D 45/001 |
| 2023/0136294 A1* | 5/2023 | Bauer | ..................... | B60R 13/01 |
| | | | | 296/37.6 |
| 2025/0136209 A1* | 5/2025 | Freeman | ............... | B62D 65/12 |

\* cited by examiner

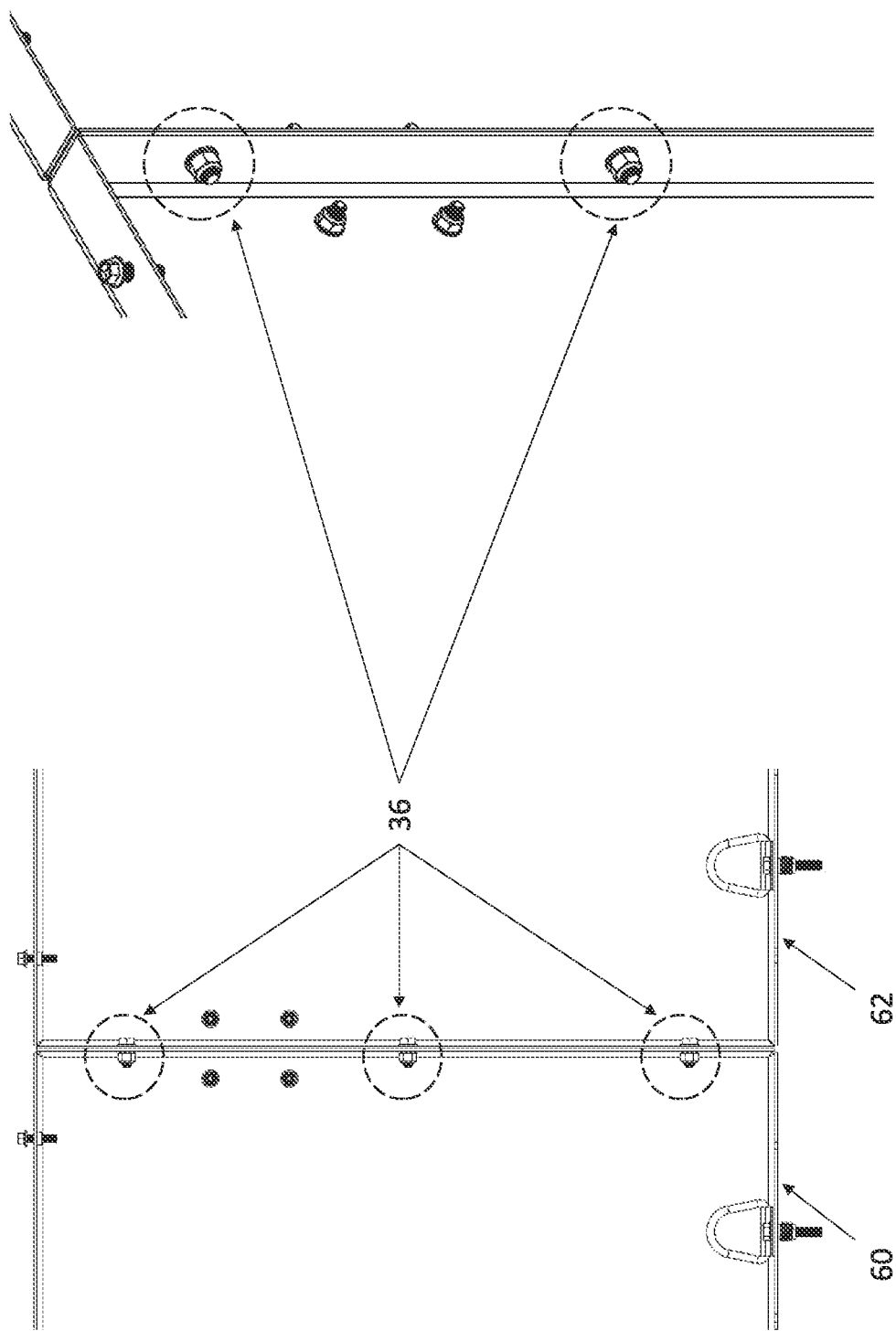

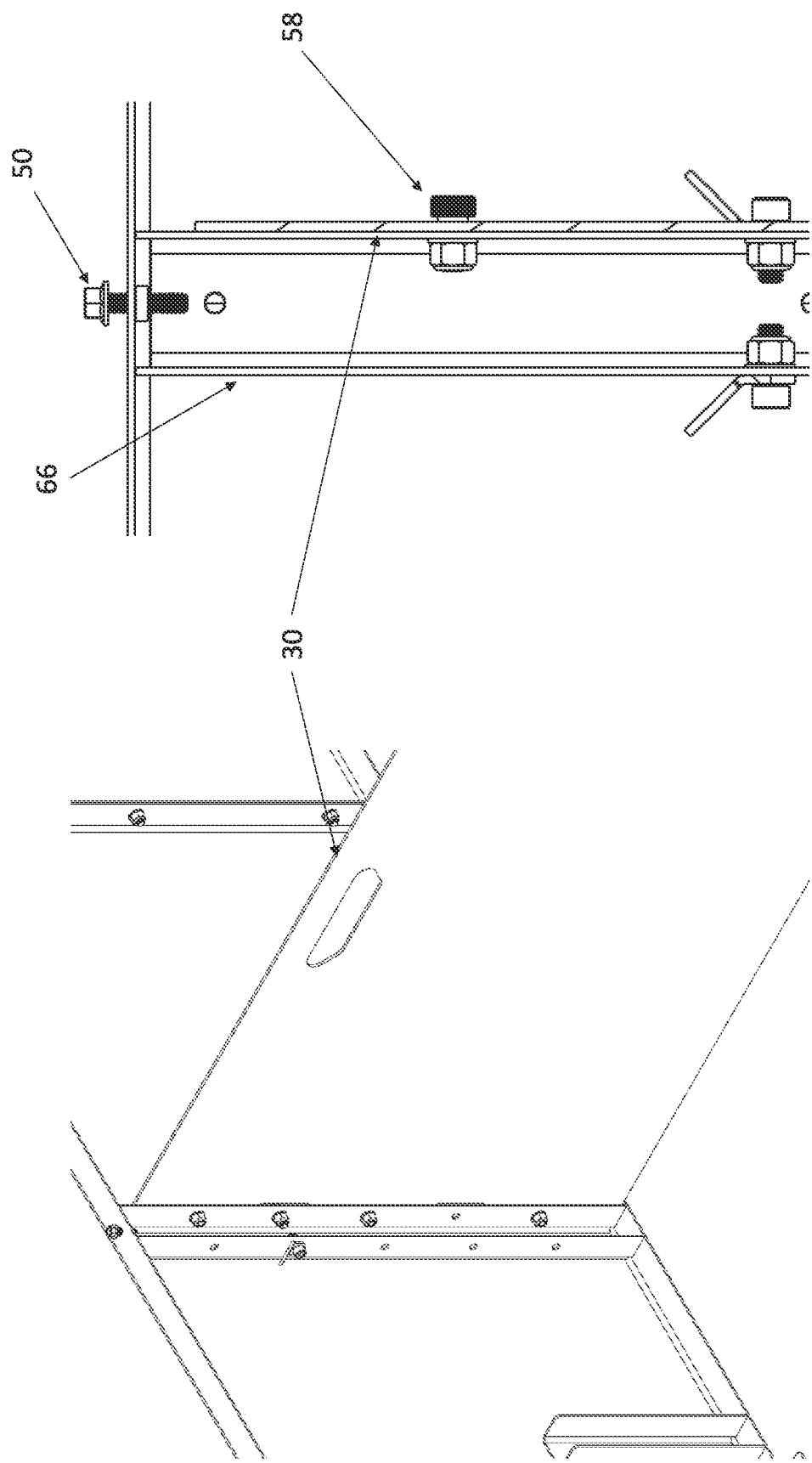

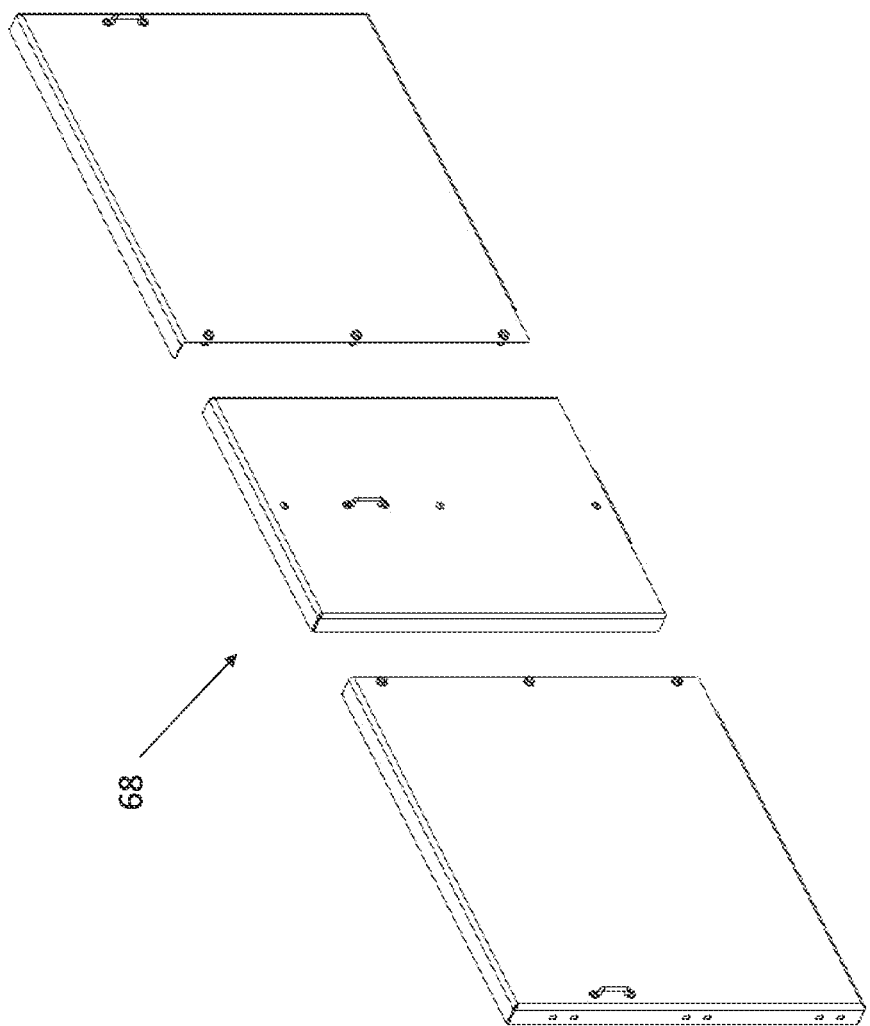

MODULAR TRAILER WALL SYSTEM

TECHNICAL FIELD

This disclosure relates to a modular trailer wall system that is detachably attached to the bed and enhances the functionality of a utility trailer.

BACKGROUND

Modular trailer walls increase the usefulness and versatility of a utility trailer. Some trailers have an open front that faces the vehicle, open sides, and/or an open rear.

Many utility trailers incorporate a partial above-deck wall and/or frame structure. Others have an entirely open deck with no structure. Such trailers are useful for loading and hauling large items. But the lack of a wall structure poses problems when hauling loose and smaller items. Such loads include sand, dirt, aggregate, firewood, garbage, and recreational goods.

If available and capable of safe and secure attachment to the deck of a utility trailer, modular walls may allow loose loads to be contained and for protection of other loads from road spray, debris, rain, and other environmental effects.

Numerous do-it-yourself utility trailer walls are known. They are sometimes made from a range of wood and metal materials. In use, such trailer walls are mounted on a deck towed behind vehicles on public roadways and more unfinished road surfaces.

Various arrangements are known for wrapping or covering a trailered load with tarps, blankets, and straps. But such arrangements may be insecure or semi-permanent.

Wooden containment solutions usually have a limited life expectancy, primarily due to weather and wear and tear.

Additionally, prior solutions often fail to take full advantage of an existing underlying trailer structure. This may result in unsatisfactory installation and attachment methods to the trailer.

Further, existing solutions are often unique to a single trailer size or manufacturer.

Another characteristic of several prior solutions is that they typically may provide the ability to contain loose loads but provide limited to no secure load tie-down options.

Against this background, it would be desirable to have deck-level, mid-wall, and upper-wall tie-down arrangements associated with the modular walls, thereby allowing smaller and larger items to be secured. Further, it would be beneficial to include one or more partitions that may allow loose or smaller items to be suitably organized. Additionally, it may be beneficial to provide a wall system that has different wall dimensions and configurations from which the user may select according to the characteristics of the load to be carried.

SUMMARY

Disclosed herein is a durable and versatile modular trailer wall system 10 for quick installation and removal on for example, common utility trailer sizes (e.g., 5'×8', 5'×10', 6'×10', 6'×12', 7'×14', and more). The wall system is preferably made from aluminum due to its structural integrity, durability, corrosion resistance, and lightweight characteristics.

One representative embodiment of the wall system can be installed on a typical utility trailer deck surface with hardware and supplementally be attached by one or more brackets that attach to pre-existing, above-deck trailer features.

Many embodiments of the wall system effectively contain loose loads, and secure loads using deck-mounted, mid-wall, and upper-wall tie-downs. If desired, a movable, adjustable partition is also provided. In some embodiments, one or more expandable walls may be offered. The system installs with minimal modifications to an existing trailer structure and requires minimal tooling to emplace and install and remove walls. Further, the walls are separable into individual panel forms for lightweight, ease of handling while presenting a reduced storage footprint.

BRIEF DESCRIPTION OF THE DRAWINGS

FIGS. 8A & B show exemplary side wall-to-side wall attachment;

FIGS. 9A & B show the engagement of a removable partition;

FIG. 16 shows another partially disassembled view thereof.

DETAILED DESCRIPTION

Figure 1:
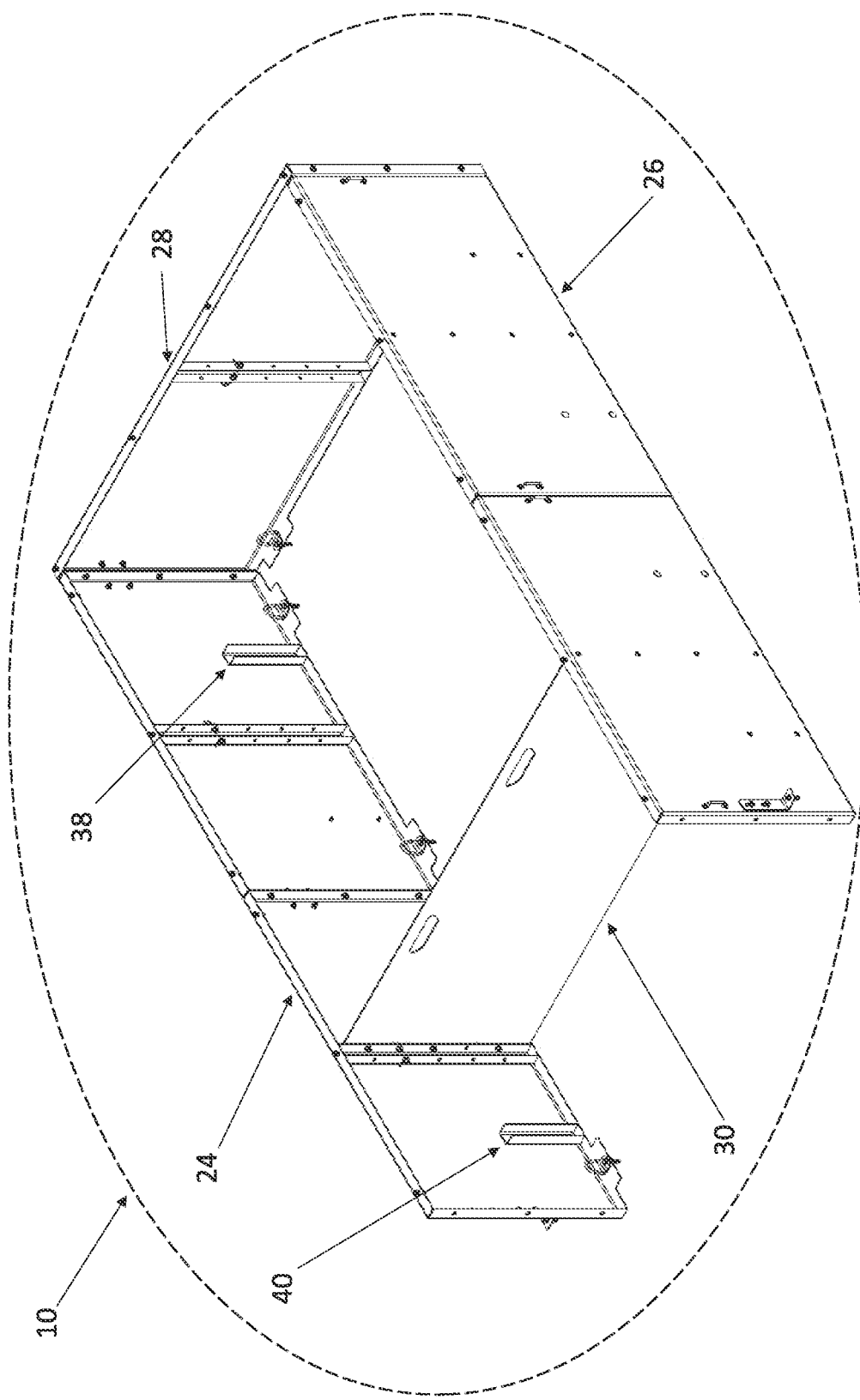
FIG. 1 is a perspective view of a modular trailer wall system according to one embodiment thereof before emplacement on a utility trailer deck.
Figure 2:
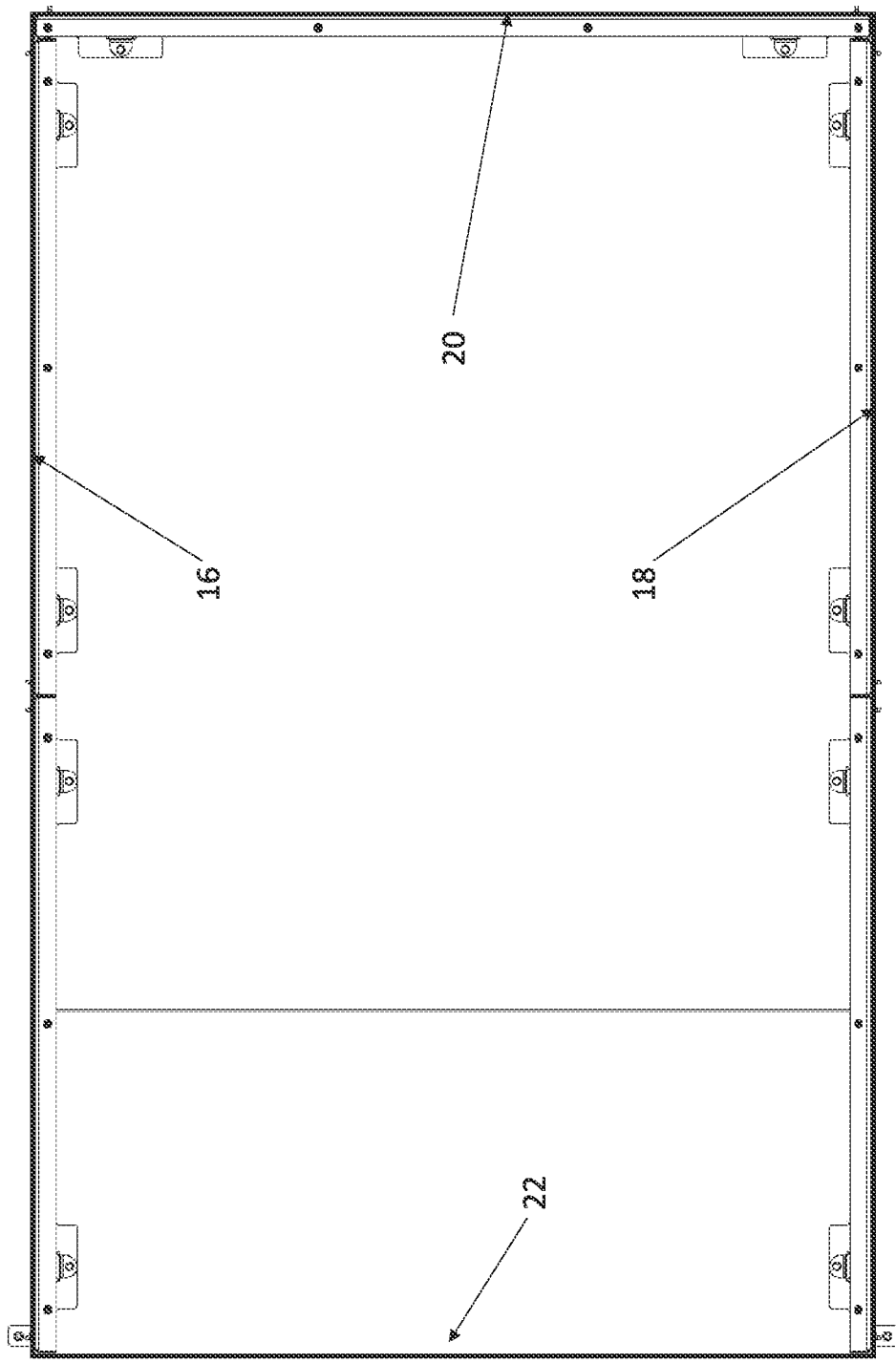
FIG. 2 depicts a top view thereof.
Figure 3:
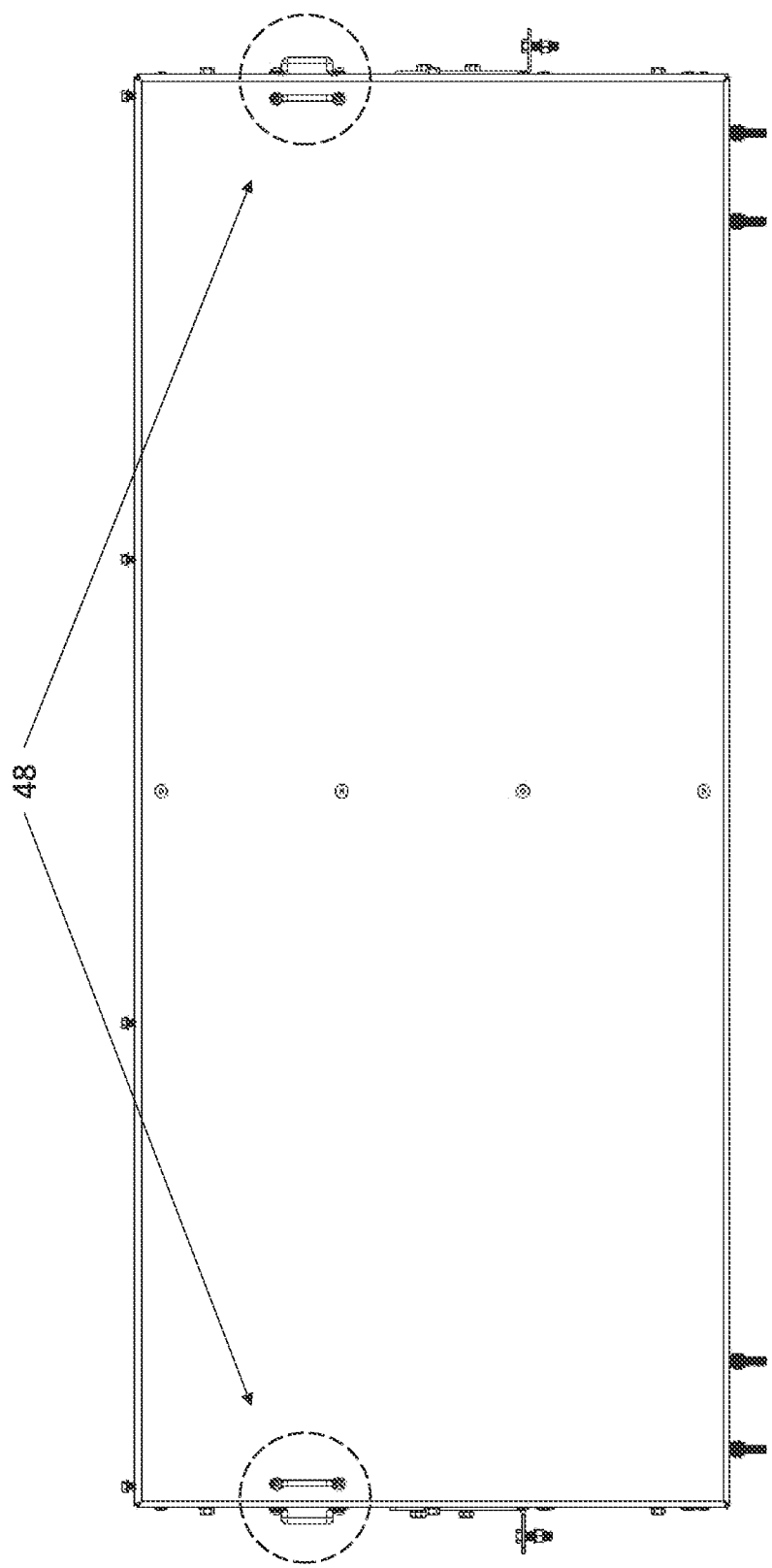
FIG. 3 is an exterior front view thereof.
Figure 4:
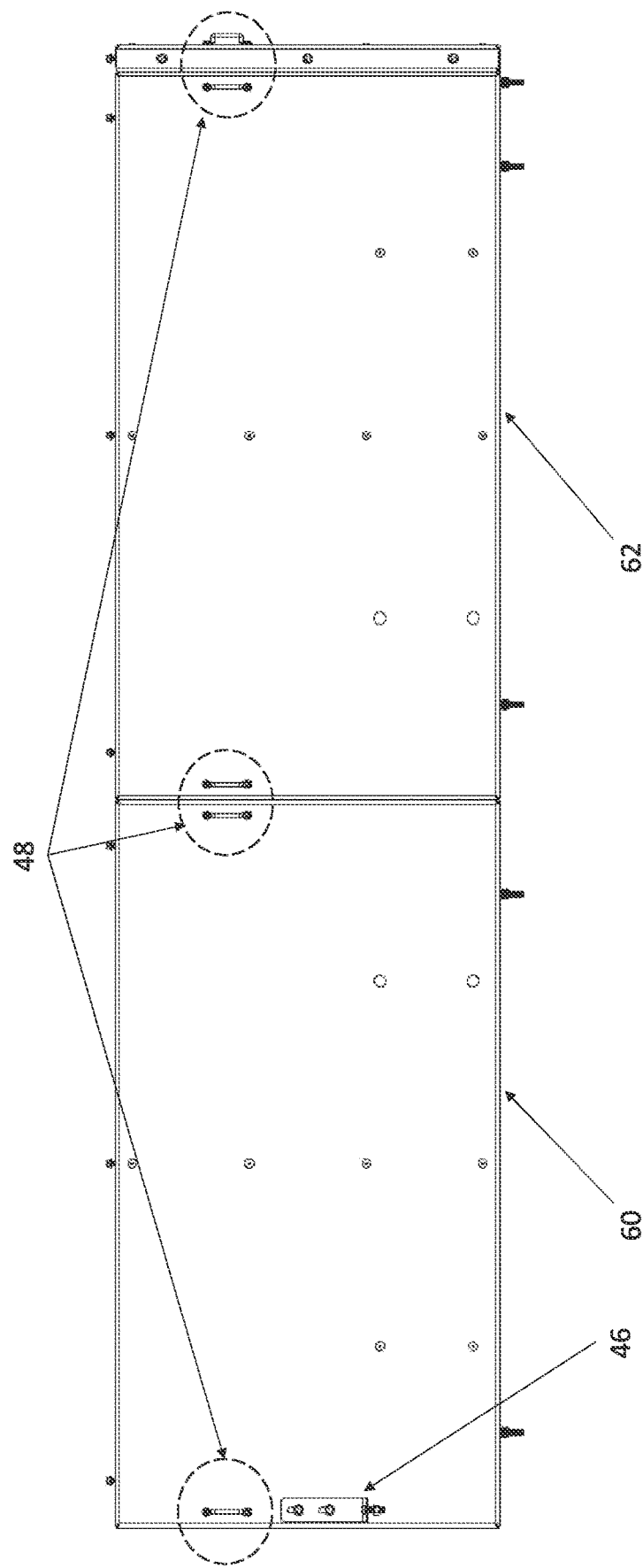
FIG. 4 is an exterior side view thereof.
Figure 5:
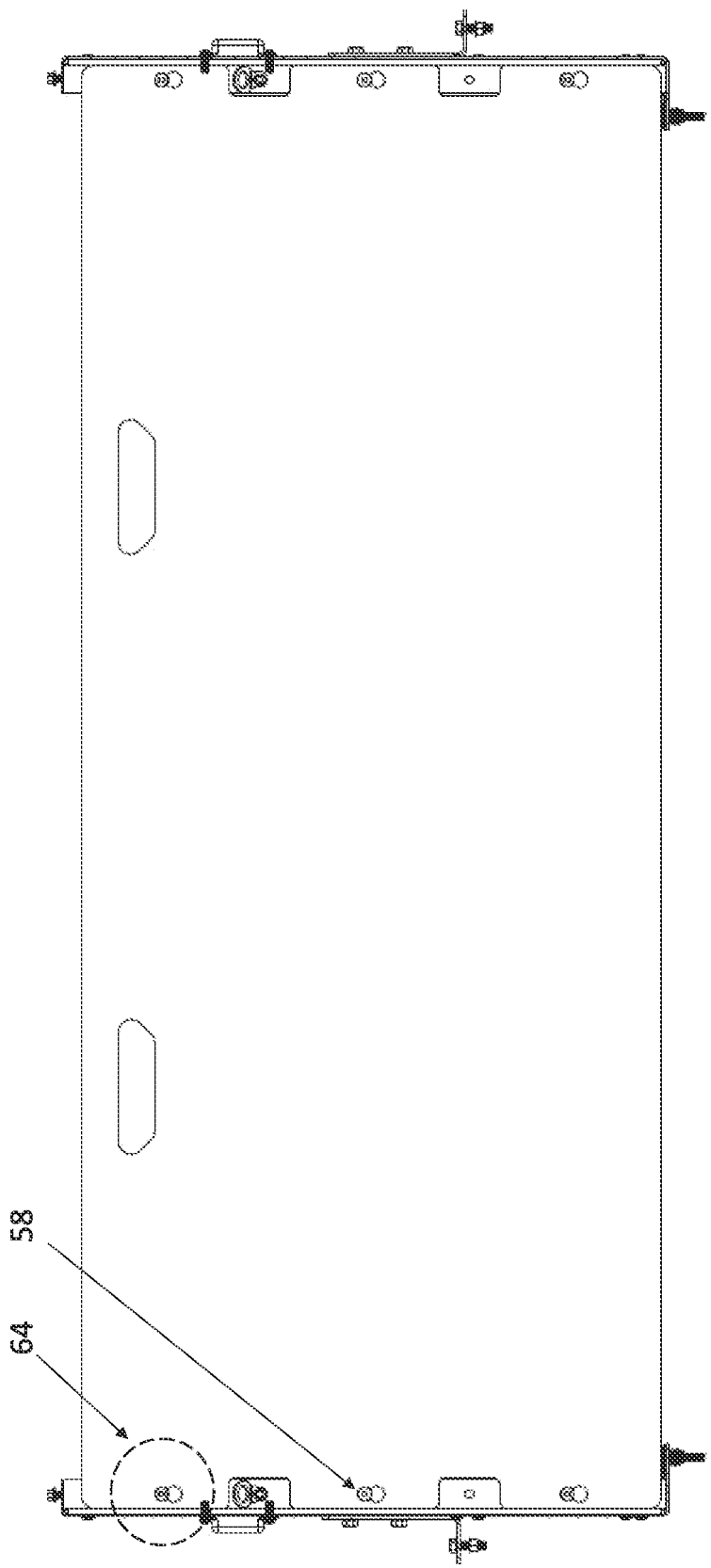
FIG. 5 is an exterior rear view thereof.
Figure 6:
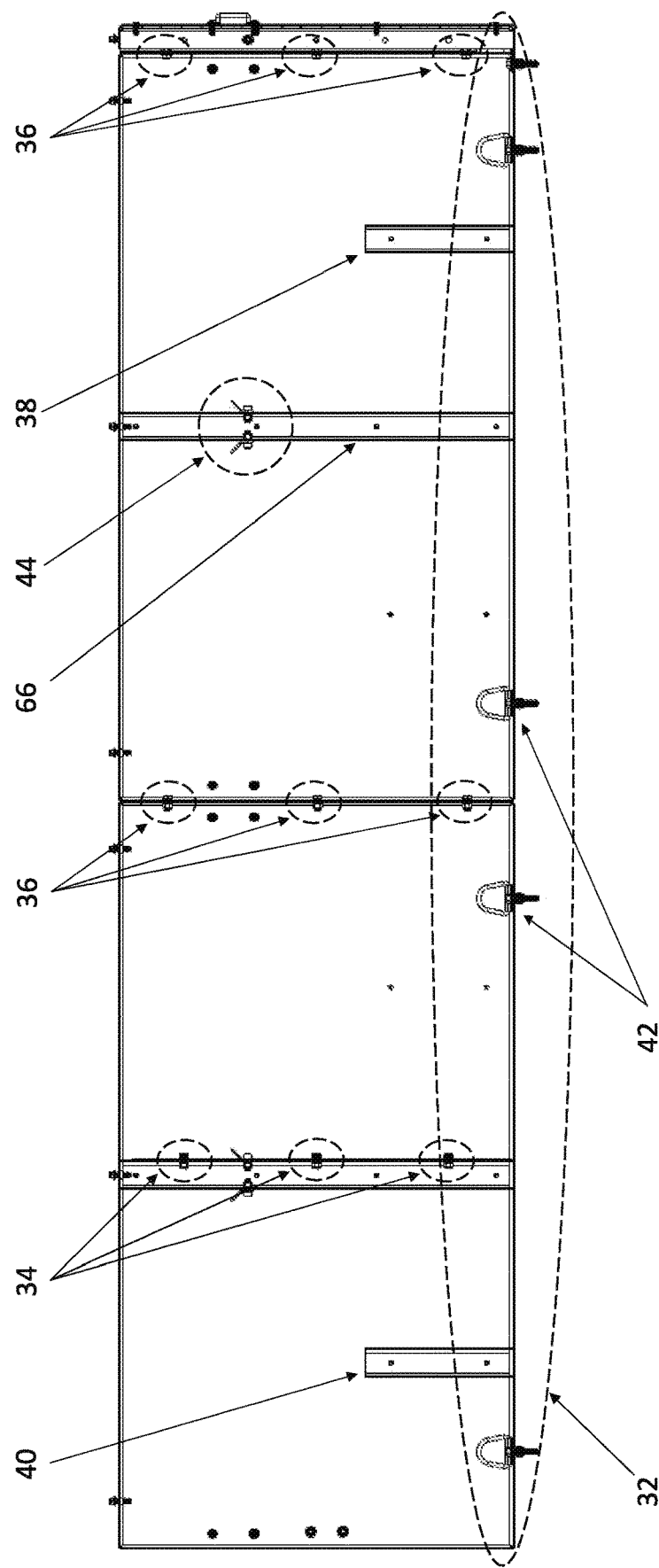
FIG. 6 is an interior section view thereof.
Figure 7B:
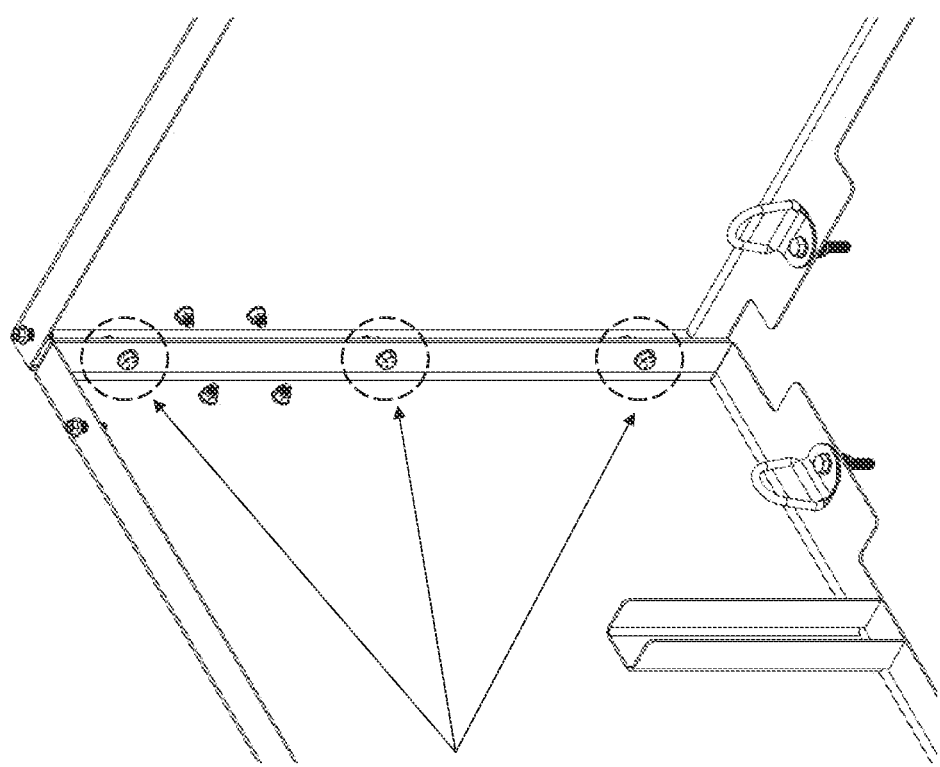
FIGS. 7A & B show detail of exemplary sidewall to front wall attachment views.
Figure 7A:
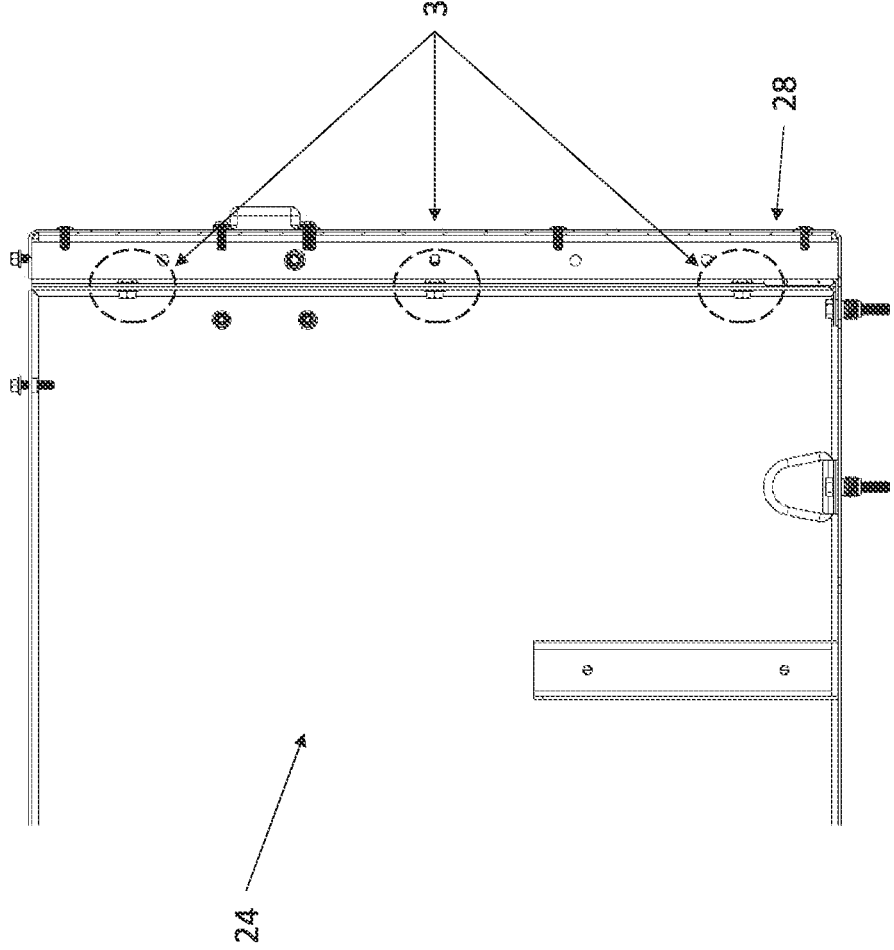
Figure 10:
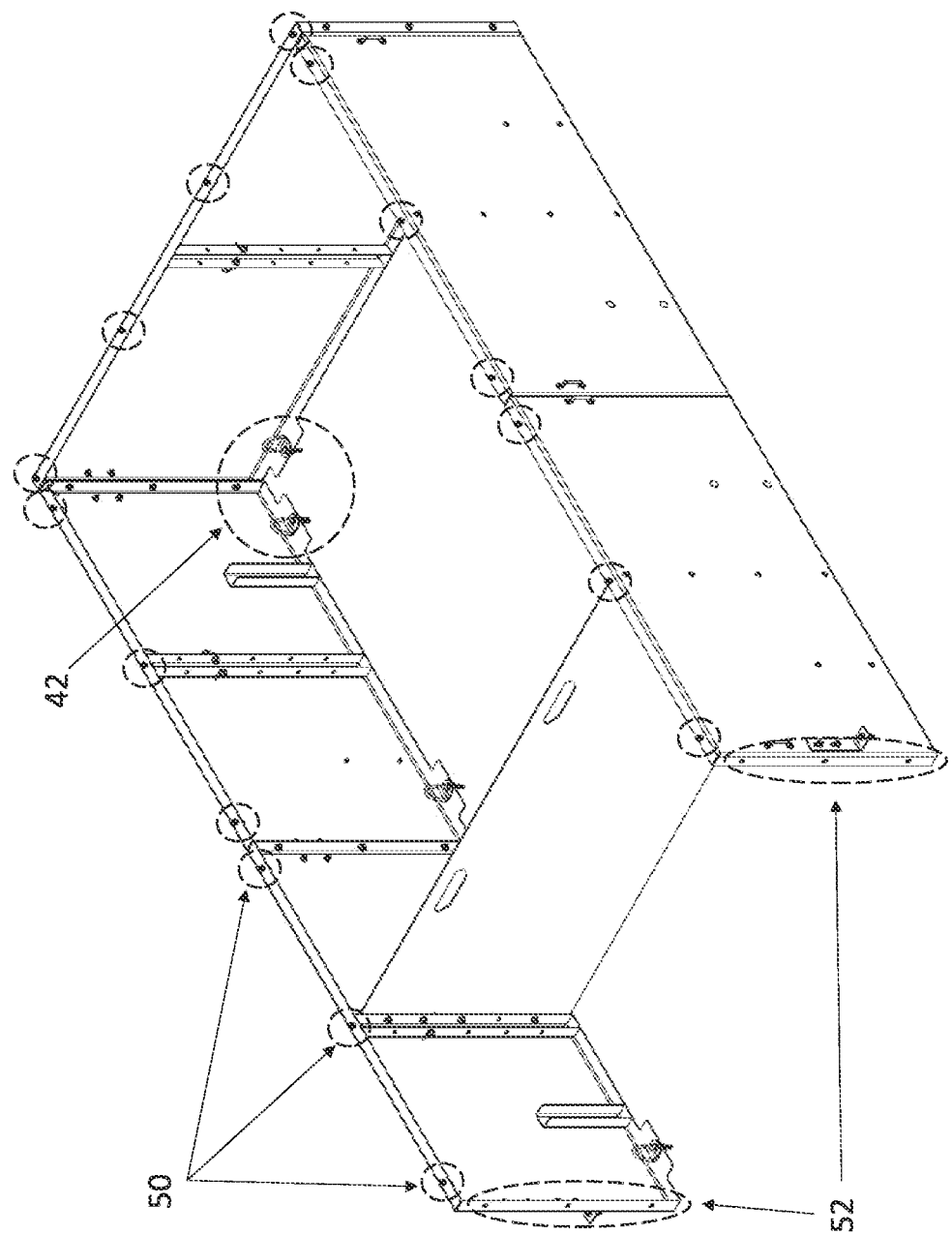
FIG. 10 shows cutouts and fasteners used to secure covers in addition to lower cargo tie-downs.
Figure 11B:
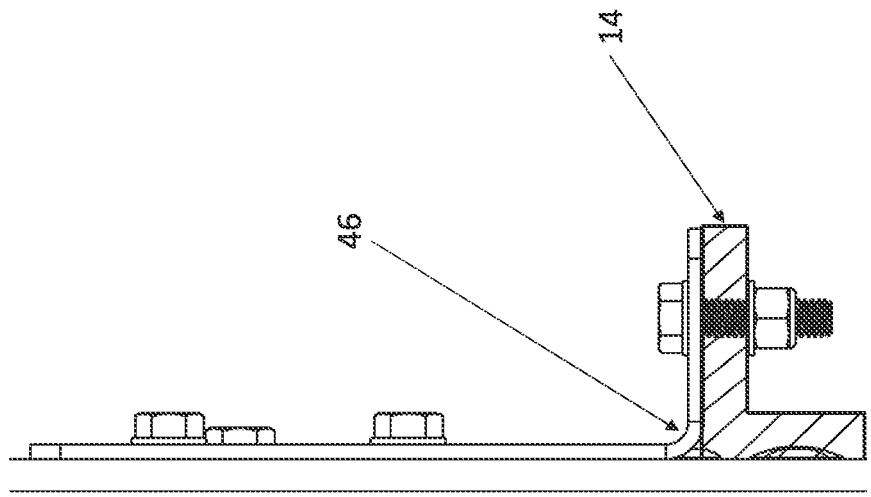
FIGS. 11A & B show methods by which the system is detachably attached to a utility trailer.
Figure 11A:
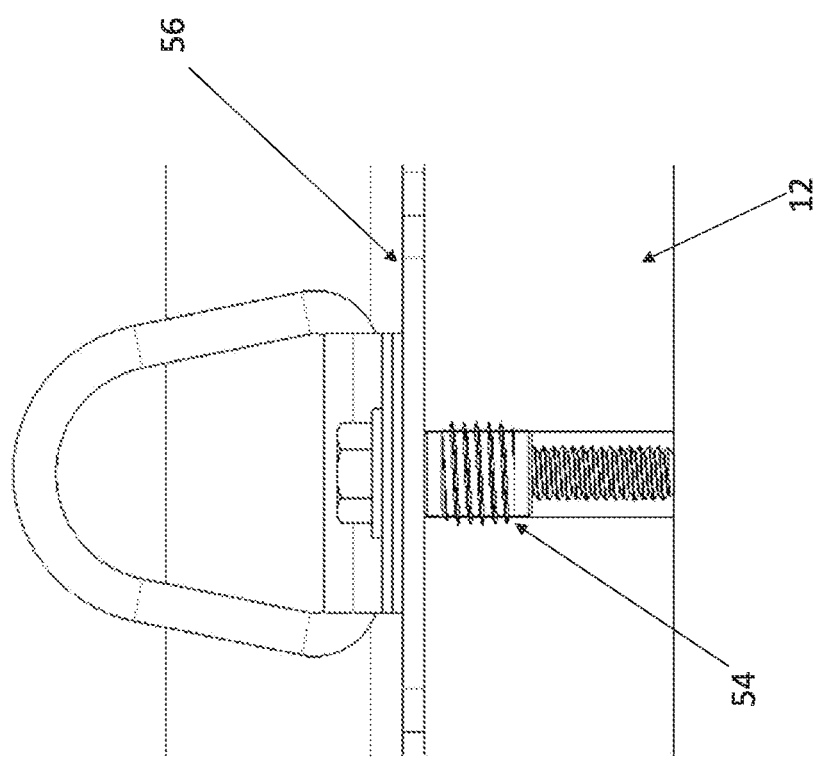
Figure 12:
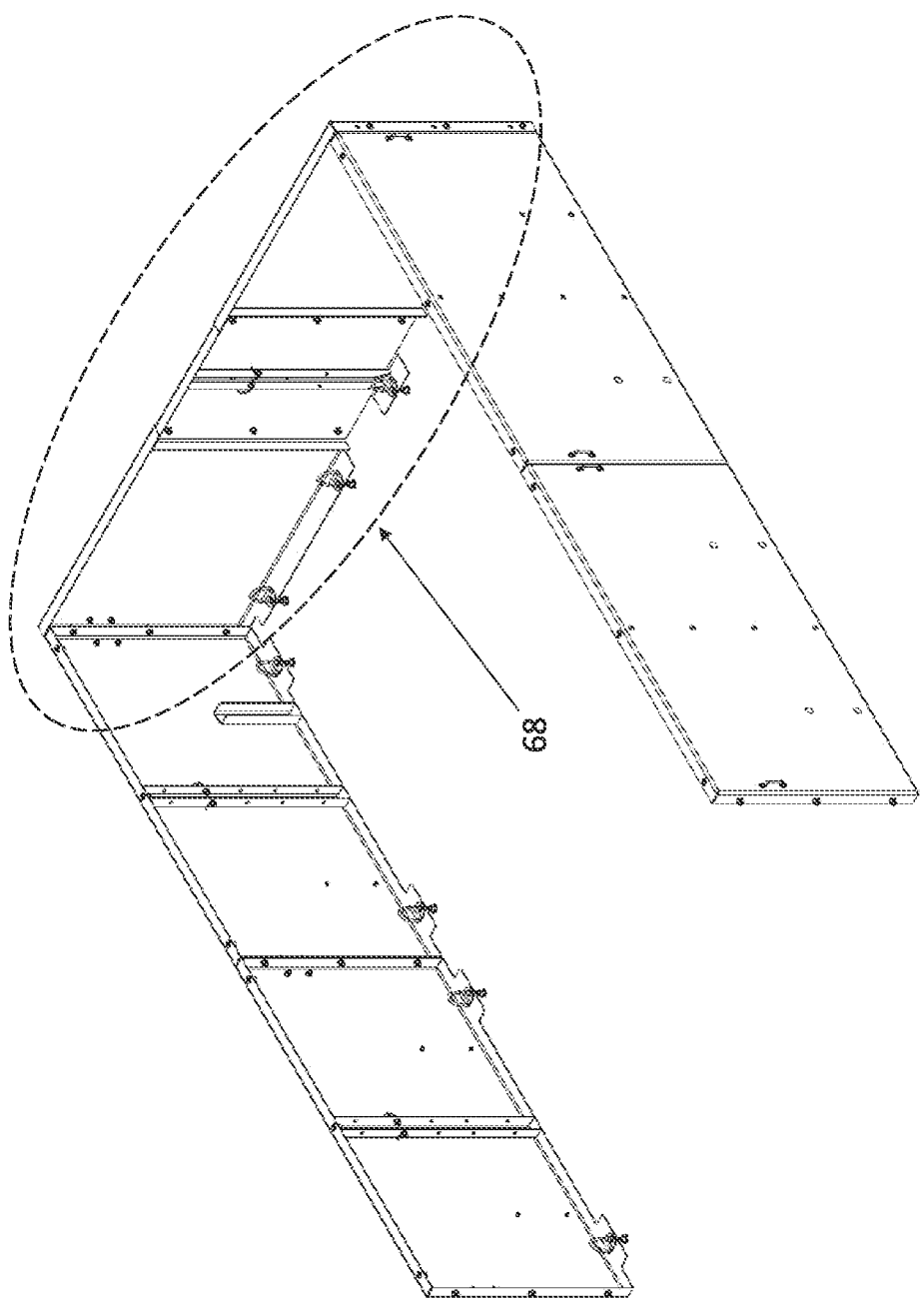
FIG. 12 depicts an optional expandable wall.
Figure 13:
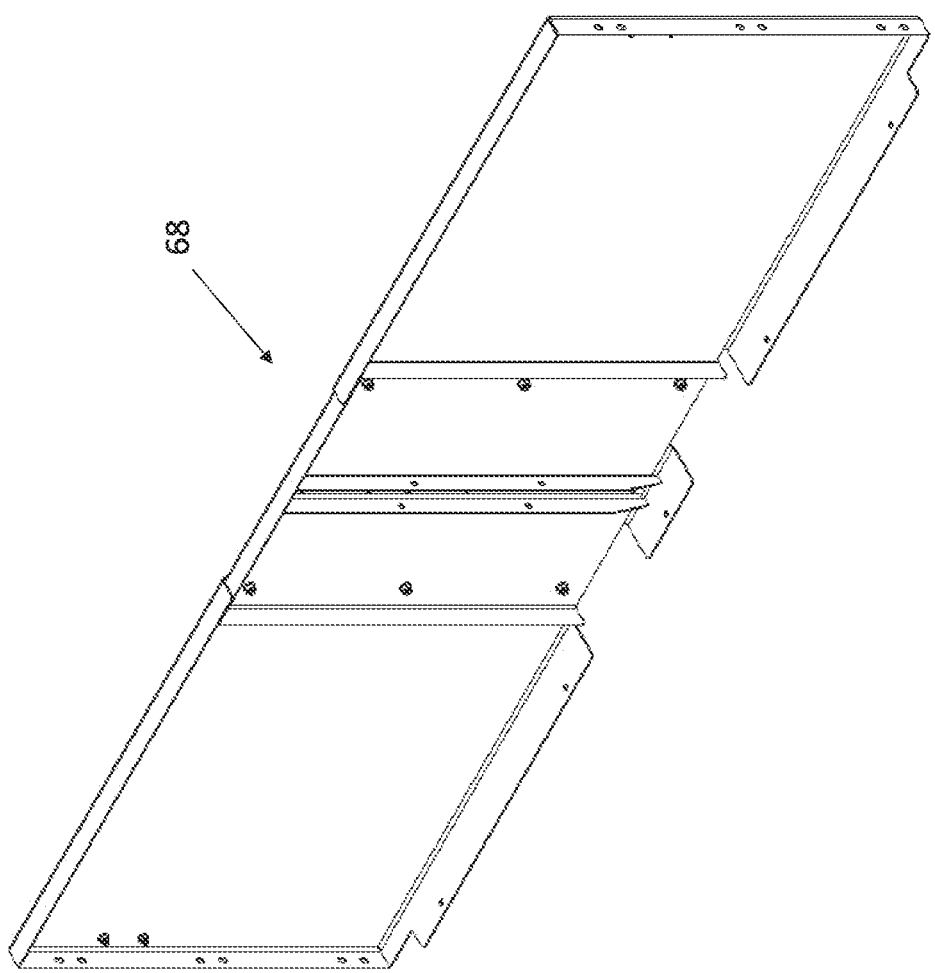
FIG. 13 is another view thereof in isolation from adjacent walls.
Figure 14:
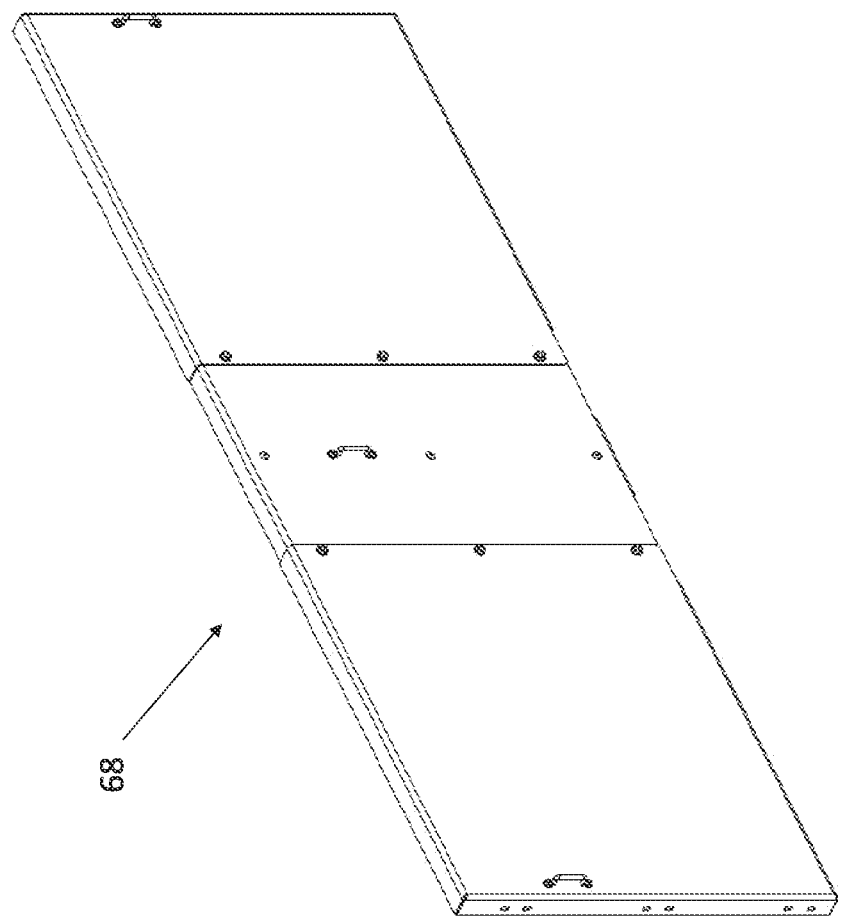
FIG. 14 shows a front perspective view thereof.
Figure 15:
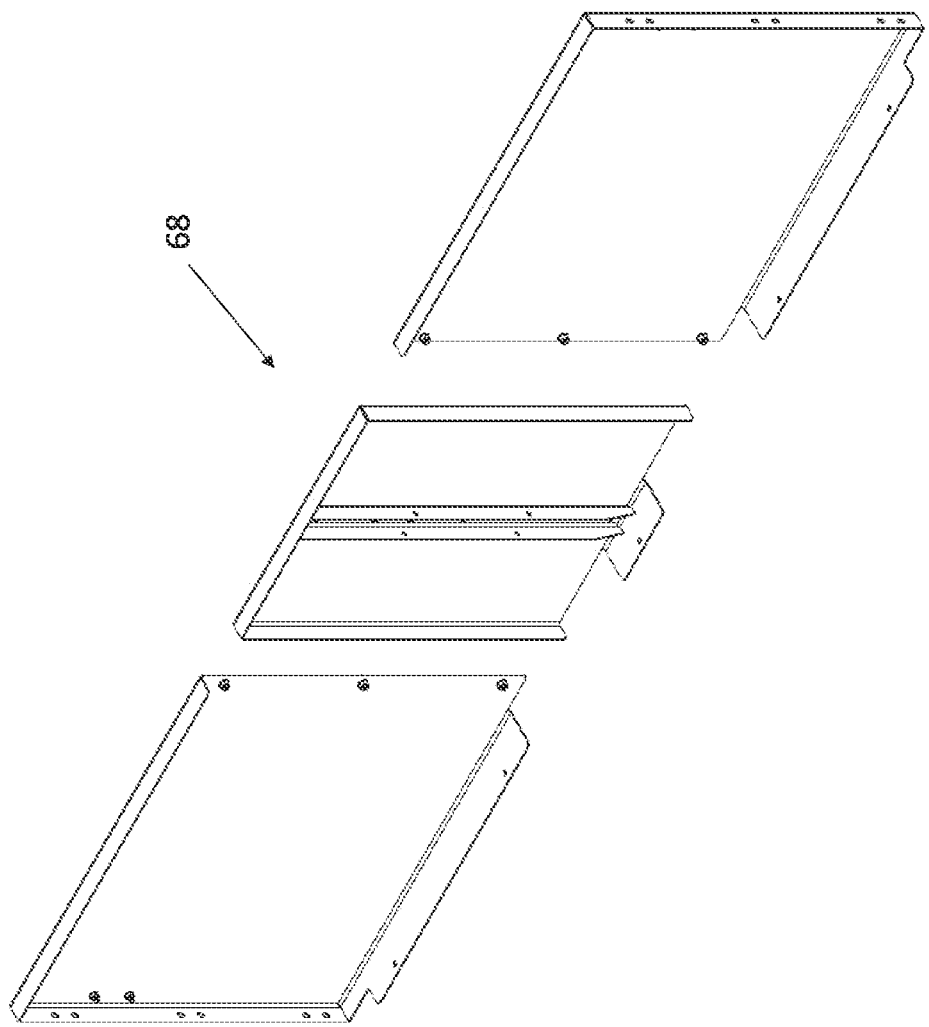
FIG. 15 shows a partially disassembled view thereof.

As required, detailed embodiments of the present invention are disclosed herein; however, it is understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Disclosed herein is a modular trailer wall system 10 for containing loose loads. In several embodiments, the trailer system is detachably attached to a deck of a utility trailer 12. The deck 12 and the wall system 10 are adapted to be towed by a vehicle.

For ease of reference, deck 12 can be considered to have a pair of lateral edges 16, 18. A leading edge 20 extends between the lateral edges 16, 18. The leading edge 20 faces the vehicle. A trailing edge 22 extends between the lateral edges 16, 18. The trailing edge 22 faces away from the vehicle.

Preferably, wall system 10 is metallic for structural integrity, durability, and corrosion resistance. Aluminum or an alloy thereof is preferred.

The wall system 10 has two side walls 24, 26, extending upwardly from the pair of lateral edges 16, 18 of the deck.

A front wall 28 extends upwardly from the leading edge 20 of deck 12. A removable, adjustable partition 30 rises upwardly from deck 12. If desired, partition 30 is adapted to be placed toward the trailing edge of the deck, or at a position closer to the leading edge of the deck. The removable partition 30 extends between the two side walls 24, 26 at a position that lies above or ahead of the trailing edge of the deck.

In several embodiments, one or more locking mechanisms 34 detachably attach the removable partition 30 in its upright position to one or more side walls 24, 26. One or more attachment mechanisms or cargo tie-downs 42 secure the wall to the deck 12 at trailer deck attachment points 56.

In some cases, the removable partition 30 is pivotably attached to a lower region 32 of the two side walls 24, 26 and is adapted to move between an upright position and a reclined position when attached to the trailing edge of the deck, thus providing a loading ramp to facilitate access to the deck 12.

Preferably, each side wall 24, 26 has a front bracket 38 and a rear bracket 40 attached. The front and rear brackets 38, 40 extend upwardly from a lower edge of each side wall 24, 26 and are adapted to accommodate and guide standard dimensional lumber (2×4, 2×6, 2×10, and more) to be used for partitioning of loads.

A plurality of lower cargo tie-downs 42 is located around a lower edge of each side wall 24, 26, and front wall 28.

One or more intermediate cargo tie-downs 44 are positioned around a middle-height region of each side wall 24, 26, and front wall 28.

Trailer frame attachment brackets 46 are situated on an exterior surface of the side walls 24, and 26 at a rear region.

If desired, supplemental tie-downs 48 are provided around an exterior perimeter of the side walls 24, 26, and front wall 28.

In some embodiments, one or more fasteners 50 are positioned around an upper perimeter of the side walls 24, 26, and front wall 28 so that a top cover may be installed for cargo protection.

If desired, rear cut-outs 52 may be provided in a rearward facing edge of the side walls 24, 26, the rear cut-outs 52 being adapted to secure an end cover for added protection of the cargo or to connect to additional abutted walls.

In some embodiments, wall system 10 is detachably attached to deck 12 by threaded inserts 54 in holes drilled into deck 12 for receiving bolts that secure a bottom flange of the side walls 24, 26, and front wall 28 to the deck 12.

Wall-to-trailer attachment brackets 46 are provided on a rear exterior region of the trailer walls. The brackets 46 are secured to the side walls 24, 26 and a trailer frame 14. In some embodiments, the attachment mechanism includes a quick-release pin or fastener.

Fasteners 36 are provided to secure the surfaces of the front wall 28 that meet the edges of the side walls 24, 26 so that the front wall 28 is secured to the side walls 24, 26.

In alternative embodiments, each side wall 24, 26 comprises shorter side wall segments 60, 62 that abut below a connector plate or using fasteners 36, thereby providing a longer assembled side wall 24, 26.

In some embodiments, the removable partition 30 contains cutouts 64 that mate with shoulder fasteners 58 which protrude from vertical rails 66 on each side wall 24, 26.

In some embodiments, an expandable wall 68 may be provided. In use, the expandable wall offers the user to select a wider or narrower separation between the side walls 24, 26, adapting to a wide range of trailer dimensions.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

| LIST OF REFERENCE NUMERALS | |
|---|---|
| 10 | modular trailer wall system |
| 12 | trailer deck |
| 14 | trailer frame |
| 16 | lateral edge |
| 18 | lateral edge |
| 20 | leading edge |
| 22 | trailing edge |
| 24 | side wall |
| 26 | side wall |
| 28 | front wall |
| 30 | removable partition |
| 32 | lower region of side wall |
| 34 | locking mechanism |
| 36 | attachment mechanism |
| 38 | front bracket |
| 40 | rear bracket |
| 42 | lower cargo tie-downs |
| 44 | intermediate cargo tie-downs |
| 46 | trailer frame attachment brackets |
| 48 | supplemental tie-downs |
| 50 | top cover fasteners |
| 52 | rear cut-outs |
| 54 | threaded inserts |
| 56 | trailer deck attachment points |
| 58 | shoulder fasteners |
| 60 | shorter side wall segment |
| 62 | shorter side wall segment |
| 64 | cutouts in removable partition |
| 66 | vertical rail |
| 68 | expandable wall |

What is claimed is:

1. A modular trailer wall system for containing loads, the trailer system being detachably attached to a deck of a utility trailer, the deck and wall system being adapted to be towed by a utility vehicle, the deck having
   a pair of lateral edges;
   a leading edge extending between the lateral edges that faces the utility vehicle; and
   a trailing edge extending between the lateral edges that faces away from the utility vehicle,
   the wall system being metallic for structural integrity, durability, and corrosion resistance and having
   two side walls extending upwardly from the pair of lateral edges of the deck;
   a front wall extending upwardly from the leading edge of the deck;
   a removable partition extending upwardly from the deck, the removable partition being adapted to extend between the two side walls at a position that lies above or ahead of the trailing edge of the deck;
   locking mechanisms to detachably attach the removable partition to one or more of the side walls;
   upper attachment mechanisms that secure the two side walls to the front wall;
   lower attachment mechanisms that secure the wall system to the deck; and
   a plurality of rear cut-outs provided in a rearward facing edge of each side wall, the rear cut-outs being adapted to secure an end cover for added protection of the cargo or to be used to connect to additional abutted walls.

2. The modular trailer wall system of claim 1, wherein each side wall has a front bracket attached thereto and a rear bracket attached thereto, the front and rear brackets extending upwardly from a lower edge of each side wall and being adapted to accommodate standard dimensional lumber.

3. The modular trailer wall system of claim 1, wherein the lower cargo tie-downs are located around a lower edge of the interior perimeter of each side wall and front wall.

4. The modular trailer wall system of claim 1, further including a plurality of intermediate cargo tie-downs located around a middle-height region of the interior of each side wall and front wall.

5. The modular trailer wall system of claim 1, further including a plurality of trailer frame attachment brackets located on an exterior surface of the side walls at a rear region thereof.

6. The modular trailer wall system of claim 1, further including a plurality of supplemental tie-downs located around the exterior of each side wall and front wall.

7. The modular trailer wall system of claim 1, further including a plurality of fasteners provided around an upper perimeter of each side wall and front wall so that a top cover may be detachably attached for cargo protection.

8. The modular trailer wall system of claim 1, further including a plurality of trailer deck attachment points located around a lower edge of the interior perimeter of each side wall and front wall.

9. The modular trailer wall system of claim 1, wherein the lower attachment mechanism by which the wall system is detachably attached to the deck includes fasteners that secure a bottom flange of the side walls and front wall to the deck.

10. The modular trailer wall system of claim 1, wherein the upper attachment mechanism includes fasteners provided at surfaces of the front wall that meet the edges of the side walls so that the front wall is secured to the side walls.

11. The modular trailer wall system of claim 1, wherein the front wall comprises a configuration selected from the group consisting of a single segment and multiple shorter segments that are fastened together to form an adjustably dimensioned assembled front wall.

12. The modular trailer wall system of claim 1, wherein each side wall comprises shorter side wall segments that abut and are fastened together, thereby providing a longer assembled side wall.

13. A method for detachably attaching a modular trailer wall system for containing loads to a deck of a utility trailer, the deck and wall system being adapted to be towed by the utility vehicle, the deck having
a pair of lateral edges;
a leading edge extending between the lateral edges that faces the utility vehicle;
a trailing edge extending between the lateral edges that faces away from the utility vehicle, and
a plurality of rear cut-outs provided in a rearward facing edge of each side wall, the rear cut-outs being adapted to secure an end cover for added protection of the cargo or to be used to connect to additional abutted walls,
the method comprising the steps, not necessarily being performed in the sequence listed, of
mounting two side walls on the deck so that they extend upwardly from the lateral edges of the deck;
attaching a front wall to the deck so that it extends upwardly from the leading edge of the deck;
securing the side walls to the front wall; and
placing a removable partition extending upwardly from the deck between the side walls, the removable partition being adapted to extend between the two side walls at a position that lies above or ahead of the trailing edge of the deck.

14. A modular trailer wall system for containing loads, the trailer system being detachably attached to a deck of a utility trailer, the deck and wall system being adapted to be towed by a utility vehicle, the deck having
a pair of lateral edges;
a leading edge extending between the lateral edges that faces the utility vehicle; and
a trailing edge extending between the lateral edges that faces away from the utility vehicle,
the wall system being metallic for structural integrity, durability, and corrosion resistance and having
two side walls extending upwardly from the pair of lateral edges of the deck;
a front wall extending upwardly from the leading edge of the deck;
a removable partition extending upwardly from the deck, the removable partition being adapted to extend between the two side walls at a position that lies above or ahead of the trailing edge of the deck;
locking mechanisms to detachably attach the removable partition to one or more of the side walls;
upper attachment mechanisms that secure the two side walls to the front wall; and
lower attachment mechanisms that secure the wall system to the deck, wherein the removable partition contains cutouts that mate with shoulder fasteners that protrude from vertical rails on each side wall.

15. The modular trailer wall system of claim 14, wherein each side wall has a front bracket attached thereto and a rear bracket attached thereto, the front and rear brackets extending upwardly from a lower edge of each side wall and being adapted to accommodate standard dimensional lumber.

16. The modular trailer wall system of claim 14, wherein the lower cargo tie-downs are located around a lower edge of the interior perimeter of each side wall and front wall.

17. The modular trailer wall system of claim 14, further including a plurality of intermediate cargo tie-downs located around a middle-height region of the interior of each side wall and front wall.

18. The modular trailer wall system of claim 14, further including a plurality of trailer frame attachment brackets located on an exterior surface of the side walls at a rear region thereof.

* * * * *